(12) United States Patent
Sung et al.

(10) Patent No.: US 8,750,559 B2
(45) Date of Patent: Jun. 10, 2014

(54) TERMINAL AND METHOD FOR PROVIDING AUGMENTED REALITY

(75) Inventors: Young Ju Sung, Seoul (KR); Yong Gu Ha, Seoul (KR)

(73) Assignee: Pantech Co., Ltd., Seoul (KR)

( * ) Notice: Subject to any disclaimer, the term of this patent is extended or adjusted under 35 U.S.C. 154(b) by 228 days.

(21) Appl. No.: 13/224,053

(22) Filed: Sep. 1, 2011

(65) Prior Publication Data

US 2012/0148106 A1    Jun. 14, 2012

(30) Foreign Application Priority Data

Dec. 13, 2010    (KR) .................. 10-2010-0126633

(51) Int. Cl.
*G06K 9/00* (2006.01)
(52) U.S. Cl.
USPC .......................................... 382/100; 345/633
(58) Field of Classification Search
None
See application file for complete search history.

(56) References Cited

U.S. PATENT DOCUMENTS

| | | | |
|---|---|---|---|
| 2008/0147730 A1* | 6/2008 | Lee et al. ................... | 707/104.1 |
| 2009/0097414 A1* | 4/2009 | Yoon et al. ..................... | 370/254 |
| 2009/0318168 A1* | 12/2009 | Khosravy et al. .......... | 455/456.3 |
| 2010/0220891 A1* | 9/2010 | Lefevre et al. ................ | 382/103 |

FOREIGN PATENT DOCUMENTS

| KR | 10-2007-0087317 | 8/2007 |
|---|---|---|
| KR | 10-2010-0128490 | 12/2010 |

OTHER PUBLICATIONS

Gbriel Takacs, Vijay Chandrasekhar, Natasha Gelfand, Yingen Xiong, Wei-Chao Chen, Thanos Bismpigiannis, Radek Grzeszczuk, Kari Pulli, and Bernd Girod, "Outdoors Augmented Reality on Mobile Phone Using Loxel-Based Visual Feature Organization", Oct. 30-31, 2008, MIR '08, Vancouver, British Columbia, Canada, pp. 427-434.*

* cited by examiner

*Primary Examiner* — Barry Drennan
*Assistant Examiner* — Siamak Harandi
(74) *Attorney, Agent, or Firm* — H.C. Park & Associates, PLC

(57) ABSTRACT

A method for providing augmented reality includes acquiring a real-world image including an object; transmitting terminal information, in which the terminal information includes a location information of a terminal and an original retrieval distance; receiving object information corresponding to the object, in which the object information is based on the transmitted terminal information; and overlapping the received object information over the corresponding object in the real-world image. A terminal to perform the methods described herein includes a location information providing unit, an information transmitting/receiving unit, an image processing unit, and a user view analyzing unit.

28 Claims, 17 Drawing Sheets

TERMINAL AND METHOD FOR PROVIDING AUGMENTED REALITY

CROSS-REFERENCE TO RELATED APPLICATION

This application claims priority from and the benefit under 35 U.S.C. §119(a) of Korean Patent Application No. 10-2010-0126633, filed on Dec. 13, 2010, which is incorporated by reference for all purposes as if fully set forth herein.

BACKGROUND

1. Field

This disclosure relates to a terminal and a method for providing augmented reality.

2. Discussion of the Background

An augmented reality technique may provide a combination of an image of the real-world, captured through a camera, and a virtual object, so that the user can interact with the virtual object in a real space.

Recently, with the emergence of smart phones, augmented reality has become more widely applied to location-based services.

However, if the location-based service applying augmented reality is provided in a crowded location, an overabundance of object information (i.e., points of interest (POIs)) may be identified in a retrieval range, which may result in too many pieces of object information being displayed on a preview screen. Overcrowding of object information in a location may result in the pieces of object information overlapping each other on the display screen.

Overlapping of pieces of object information may make it difficult to distinguish between the pieces of the object information. In addition, since there may be pieces of object information that are overlapped by other pieces of object information, the desired object information may be hidden by other pieces of object information and unable to be seen by a user. Accordingly, there may be a problem in that the user cannot easily check desired object information.

In addition, in the case where there are many pieces of object information in a retrieval range, irrelevant object information that the user does not want may also be displayed. Accordingly, there may be some difficulty in retrieving object information that the user may want to find. In addition, where an image displayed on the preview screen is too small to recognize the objects therein, a problem may arise when too many objects are displayed on the preview image. For example, such overcrowding of information may lead to a lowering of an object recognition speed and inaccurate mapping of the object information to the corresponding object to be displayed.

SUMMARY

Exemplary embodiments of the present invention provide a terminal and a method for providing augmented reality.

Additional features of the invention will be set forth in the description which follows, and in part will be apparent from the description, or may be learned by practice of the invention.

Exemplary embodiments of the present invention provide a terminal to provide augmented reality including a location information providing unit to provide location information of a terminal; a camera unit to capture a real-world image including an object; an information transmitting/receiving unit to transmit terminal information, and to receive object information retrieved based on the terminal information; an image processing unit to overlap the object information on the real-world image; and a user view analyzing unit to calculate a virtual movement distance and a virtual movement location of the terminal based on a zooming level, and to reset the terminal information according to the virtual movement location.

Exemplary embodiments of the present invention provide a terminal to provide augmented reality including a location information providing unit to provide location information of the terminal; an information transmitting/receiving unit to transmit the location information of the terminal and feature information of an object displayed on a real-world image, and to request and receive object information based on the location information of the terminal and the feature information of the object; an object recognition determining unit to obtain a distance between the terminal and the object based on a location information of the object and setting the obtained distance as a reference distance, in which the location information of the object is included in the received object information; an image processing unit to overlap the object information received on the real-world image; and a user view analyzing unit to calculate a virtual movement location of the terminal based on the reference distance and a zooming level, and to transmit the virtual movement location and the feature information of the object.

Exemplary embodiments of the present invention provide a method for providing augmented reality including acquiring a real-world image comprising an object; transmitting terminal information, in which the terminal information includes a location information of a terminal and an original retrieval distance; receiving object information corresponding to the object, in which the object information is based on the transmitted terminal information; and overlapping the received object information over the corresponding object in the real-world image.

Exemplary embodiments of the present invention provide a method for providing augmented reality including acquiring a real-world image comprising an object using a terminal; transmitting location information of the terminal and feature information of the object; requesting and receiving object information corresponding to the object based on the location information of the terminal and the feature information of the object; calculating a distance between the terminal and the object based on location information of the object included in the received object information; and setting the calculated distance as a reference distance.

Exemplary embodiments of the present invention provide a method for providing augmented reality including transmitting terminal information, in which the terminal information includes a location information of the terminal and an original retrieval distance; receiving object information corresponding to an object, in which the object information is based on the transmitted terminal information; overlapping the received object information over the corresponding object in the real-world image; calculating a distance between the terminal and the object based on location information of the object comprised in the received object information; and setting the calculated distance as a reference distance.

It is to be understood that both foregoing general descriptions and the following detailed description are exemplary and explanatory and are intended to provide further explanation of the invention as claimed. Other features and aspects will be apparent from the following detailed description, the drawings, and the claims.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
FIG. 1 is a schematic diagram illustrating a system to provide augmented reality according to an exemplary embodiment of the invention.

The invention is described more fully hereinafter with reference to the accompanying drawings, in which exemplary embodiments are shown. This invention may, however, be embodied in many different forms and should not be construed as limited to the exemplary embodiments set forth therein. Rather, these exemplary embodiments are provided so that this disclosure will be thorough and complete, and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. It will be further understood that for the purposes of this disclosure, "at least one of" will be interpreted to mean any combination the enumerated elements following the respective language, including combination of multiples of the enumerated elements. For example, "at least one of X, Y, and Z" will be construed to mean X only, Y only, Z only, or any combination of two or more items X, Y, and Z (e.g., XYZ, XZ, YZ).

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Throughout the drawings and the detailed description, unless otherwise described, the same drawing reference numerals are understood to refer to the same elements, features, and structures. The relative size and depiction of these elements may be exaggerated for clarity, illustration, and convenience.

FIG. 1 is a schematic diagram illustrating a system to provide augmented reality according to an exemplary embodiment of the invention.

As shown in FIG. 1, a terminal 100 connects with a server 200 using a wireless communication network. In an example, the terminal 100 may connect with the server 200 by executing an augmented reality mode. Although not illustrated, the terminal 100 may also connect with the server 200 using other suitable network technologies, such as wired networks and other suitable networks. Further, the terminal 100 may also connect with the server 200 without executing an augmented reality mode.

In an example, the terminal 100 may obtain a real-world image, which may be captured in real-time, from a camera of the terminal 100. Although the specification is described with reference to a camera of the terminal 100, the real-world image may be obtained through a network, an external memory, an external camera, or other suitable device.

The terminal 100 transmits terminal-based information with respect to the real-world image ("terminal information") including location information of the terminal 100 and an original retrieval distance to the server 200. In an example, the location information may be related to the location information of the terminal 100 at the time the respective information is transmitted to the server, or location information related to the location where the real-world image was captured. For simplicity of disclosure, the specification may be described with reference to the image capturing location as the initial location information that may be transmitted to the server 200 but is not be limited thereto. The original retrieval distance relates to a reference distance from the image capturing location of terminal 100 for which object information may be requested for one or more objects that may be identified on the real-world image. The terminal 100 may further include current azimuth information and camera viewing angle information in the terminal information to be transmitted.

In addition, the terminal 100 may request and receive object information based on the transmitted terminal information from the server 200. The terminal 100 may overlap the received object information on the real-world image, which may be captured in real-time through the camera, on the display screen of the terminal 100.

The terminal 100 may extract object information of the objects identified in the obtained real-world image. More specifically, the terminal 100 may extract object information for the objects located within the original retrieval distance, in a specific direction in which the terminal 100 is facing. In an example, the facing direction of the terminal 100 with respect to the respective objects may be provided as the current azimuth information. The terminal 100 may overlap the extracted object information on the real-world image, which may be captured in real-time, on the display screen of the terminal 100.

Further, if a zooming level of the camera is changed in the augmented reality mode, the terminal 100 may calculate a virtual movement distance and a virtual movement location of the terminal 100 based on the changed zooming level. In an example, the virtual movement distance may refer to a virtual movement within the real-world image without physical movement of the terminal 100. For example, if the zooming level of the camera is increased in the direction in which the real-world image was captured, the terminal 100 may virtually move, in the direction of the zoom, a reference distance corresponding to the increased zooming level. Accordingly, the image of the real-world may be enlarged or decreased in size according to the change in the zooming level.

Also, the virtual movement location may refer to a new location of the terminal 100 corresponding to the virtual movement distance from the image capturing location. Accordingly, if the terminal 100 is determined to have virtually moved 100 m correspondingly to the increased zooming level, the virtual movement location may be located 100 m from the image capturing location before the zooming level was changed.

Although zooming levels may be increased or decreased in similar manner, the change in zooming levels will be described with respect to an increase in zooming level for the sake of simplicity in disclosure. Accordingly, unless otherwise stated, it is assumed that the change in the zooming level is referring to an increase in the zooming level.

In an example, if the zooming level is changed to view the image 600 meters closer than where a picture was originally captured, the terminal 100 may calculate the virtual movement to be 600 meters in a frontal direction, i.e., toward the object. In addition, the terminal 100 may also set a new retrieval distance based on the virtual movement distance. In an example, the new retrieval distance may be calculated by subtracting the virtual movement distance from the original retrieval distance. Further, the terminal 100 may reset the terminal information corresponding to the virtual movement location and the new retrieval distance, and transmit at least one of the virtual movement distance, the new retrieval distance, and the reset terminal information to the server 200.

If the zooming level of the camera is changed in the augmented reality mode, the terminal 100 may extract feature information of objects displayed on a preview image of the real-world (which may be enlarged if the zooming level is increased), transmit the extracted feature information to the server 200 along with the reset terminal information, receive object information based on the reset terminal information and the feature information from the server 200, and overlap the received object information on the real-world image, which may be captured in real-time through the camera, on the display screen. By overlapping the received object information over the real-world image, each piece of the object information may be matched with a location of a corresponding object with respect to the changed zooming level.

In an example, the feature information of objects may refer to information that may aid in identifying an object. For example, feature information may include a sign of a restaurant, trademarked images and names, key words (e.g., "restaurant", "coffee"), and the like.

In an example, the terminal 100 may also transmit its location information of the terminal 100 and the feature information of the objects extracted from the preview screen to the server 200. In an example, the location information of the terminal 100 may refer to the image capturing location or the virtual movement location if zooming level was changed. However, location information of the terminal 100 is not limited thereto.

The terminal 100 may request object information retrieved based on the transmitted location information of the terminal 100 and the feature information of objects from the server 200. Further, if the requested object information is available, the terminal 100 may receive the requested object information from the server 200, which may include location information of one or more objects. The terminal 100 may obtain distance information between the terminal 100 and an object based on the location information of the object included in the received object information. The obtained distance information may be used to set the obtained distance as a reference distance.

If the zooming level of the camera is changed by the user in the augmented reality mode, the terminal 100 may calculate the virtual movement location of the terminal 100 based on the reference distance and the changed zooming level, transmit the virtual movement distance thereof and feature information of objects extracted from the real-world image, which may be enlarged or decreased in size according to the change in the zooming level, to the server 200. The terminal 100 may receive object information retrieved based on the virtual movement distance and the feature information from the server 200.

The server 200 may retrieve object information based on the terminal information received from the terminal 100, or retrieve object information based on the image capturing location information (or the virtual movement location) of the terminal 100 and the feature information received from the terminal 100. The server 200 may transmit the retrieved object information to the terminal 100 to provide augmented reality.

Figure 2:
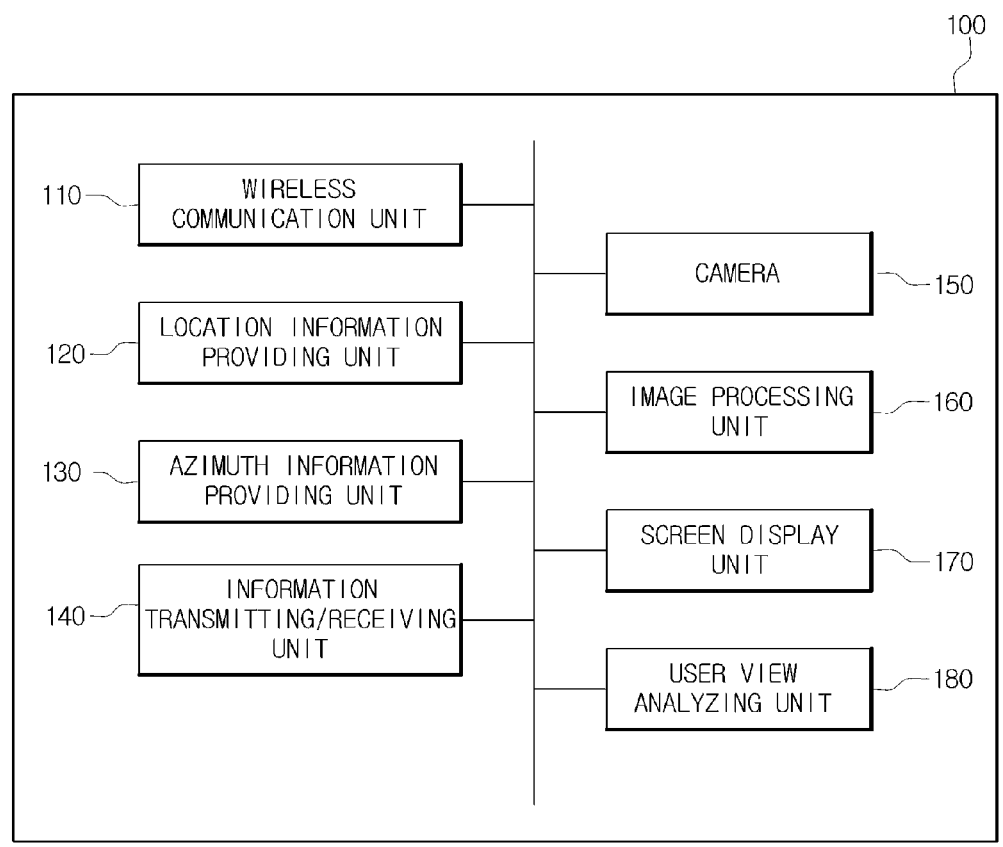
FIG. 2 is a schematic diagram illustrating a terminal to provide augmented reality according to an exemplary embodiment of the invention.

FIG. 2 is a schematic diagram illustrating a terminal configuration to provide augmented reality according to an exemplary embodiment of the invention.

As shown in FIG. 2, the terminal 100 includes a wireless communication unit 110, a location information providing unit 120, an azimuth information providing unit, an information transmitting/receiving unit 140, a camera 150, an image processing unit 160, a screen display unit 170, and a user view analyzing unit 180. In an example, the wireless communication unit 110 may be connected to the server 200 through a wireless communication network. The wireless communication unit 110 may connect to the server 200 if an augmented reality mode is executed by a user or automatically according to a reference condition.

The location information providing unit 120 may provide location information of the terminal 100. In an example, location information of the terminal 100 may refer to an image capturing location or a virtual movement location. Further, the location information may be current location information of the terminal 100. In an example, the location information providing unit 120 may provide location information of the terminal 100 based on location information retrieved from a cellular network, location information based on GPS technology, or other suitable technologies.

The azimuth information providing unit 130 may provide azimuth information corresponding to a direction to which the terminal 100 faces or directs. If the terminal 100 turns, for example, 45 degrees from the angle where a real-world image was originally taken, the azimuth information providing unit 130 may provide azimuth information corresponding to the change in the direction of the terminal 100. In an example, the azimuth information providing unit 130 may include an electronic compass or other suitable devices.

The information transmitting/receiving unit 140 may operate if the augmented reality mode is executed, and the terminal 100 connects to the server 200 through the wireless communication unit 110. The information transmitting/receiving unit 140 may transmit terminal information including location information of the terminal 100 and an original retrieval distance to the server 200. In an example, the original retrieval distance may define a boundary, in which object information for objects found within the boundary may be sought. For example, if the original retrieval distance is set at 500 meters, the terminal 100 may attempt to obtain object information for one or more objects identified within 500 meters of the terminal 100. In an example, the original retrieval distance may be a reference distance automatically set based on one or more conditions, or a reference distance set by the user. Further, the original retrieval distance may or may not change with the change in zooming levels. For example, if the zooming level increased to view objects that are located further in the background, the original retrieval distance may change accordingly with the virtual movement associated with the change in zooming level to provide a new retrieval distance or it may remain unchanged. In addition, the terminal information may further include current azimuth information and viewing angle information of the terminal 100 or a camera 150.

The information transmitting/receiving unit 140 may receive object information corresponding to one or more objects captured from the real-world image from the server 200 and transmits the received object information to the image processing unit 160.

In addition, the information transmitting/receiving unit 140 may extract, from the object information received from the server 200, directional information indicating a direction in which the terminal 100 was facing during the capturing of the real-world image. The directional information of the terminal 100 may be determined based on the azimuth information provided from the azimuth information providing unit 130. The information transmitting/receiving unit 140 may transmit the extracted directional information or the azimuth information of the terminal 100 to the image processing unit 160.

The image processing unit 160 may overlap the object information received from the information transmitting/receiving unit 140 on the real-world image, which may be captured in real-time through the camera 150, displayed on the screen display unit 170.

If the zooming level of the camera is changed by a user in the augmented reality mode, the user view analyzing unit 180 may calculate a virtual movement distance and a virtual movement location of the terminal 100 based on the changed zooming level.

In addition, the user view analyzing unit 180 may calculate and reset a new retrieval distance based on the virtual movement. In an example, the new retrieval distance may be calculated by subtracting the virtual movement distance from the original retrieval distance. In addition, the original retrieval distance may also remain unchanged in different exemplary embodiments. The user view analyzing unit 180 may reset the terminal information according to the virtual movement location and the new retrieval distance, and transmit the reset terminal information to the information transmitting/receiving unit 140. In an example, the virtual movement distance may be calculated by multiplying a ratio value obtained by dividing the original retrieval distance by the total zooming levels, and then multiplying the ratio by the changed zoom levels.

For example, if the original retrieval distance is 1 km and the number of zooming levels includes a total of 5 levels, each level may be 200 meters. Accordingly, as the zooming level is changed by 1 level, the terminal 100 virtually moves 200 m correspondingly in the direction of the zoom. Accordingly, in a case where the zooming level is increased by 2 levels, the terminal 100 may virtually move 400 m forward from the current location, providing a new retrieval distance of 600 m. In an example, the new retrieval distance may be calculated by subtracting the virtual movement distance of 400 m from the original retrieval distance of 1 km.

In the case where the zooming level of the camera is increased by the user in the augmented reality mode as described above, the information transmitting/receiving unit 140 may extract feature information of objects displayed on a preview image, which may be enlarged according to as the increased zooming level. In addition, the information transmitting/receiving unit 140 may transmit the extracted feature information to the server 200 along with the reset terminal information received from the user view analyzing unit 180, request and receive object information from the server 200, and transmit the received object information to the image processing unit 160. In an example, the object information may be retrieved by the server 200 based on the reset terminal information and feature information of objects transmitted by terminal 100. The image processing unit 160 may overlap the object information received from the information transmitting/receiving unit 140 on the real-world image, which may be captured in real-time through the camera 150, and displayed on the screen display unit 170 such that each object information is matched with a location of a corresponding object.

Figure 3:
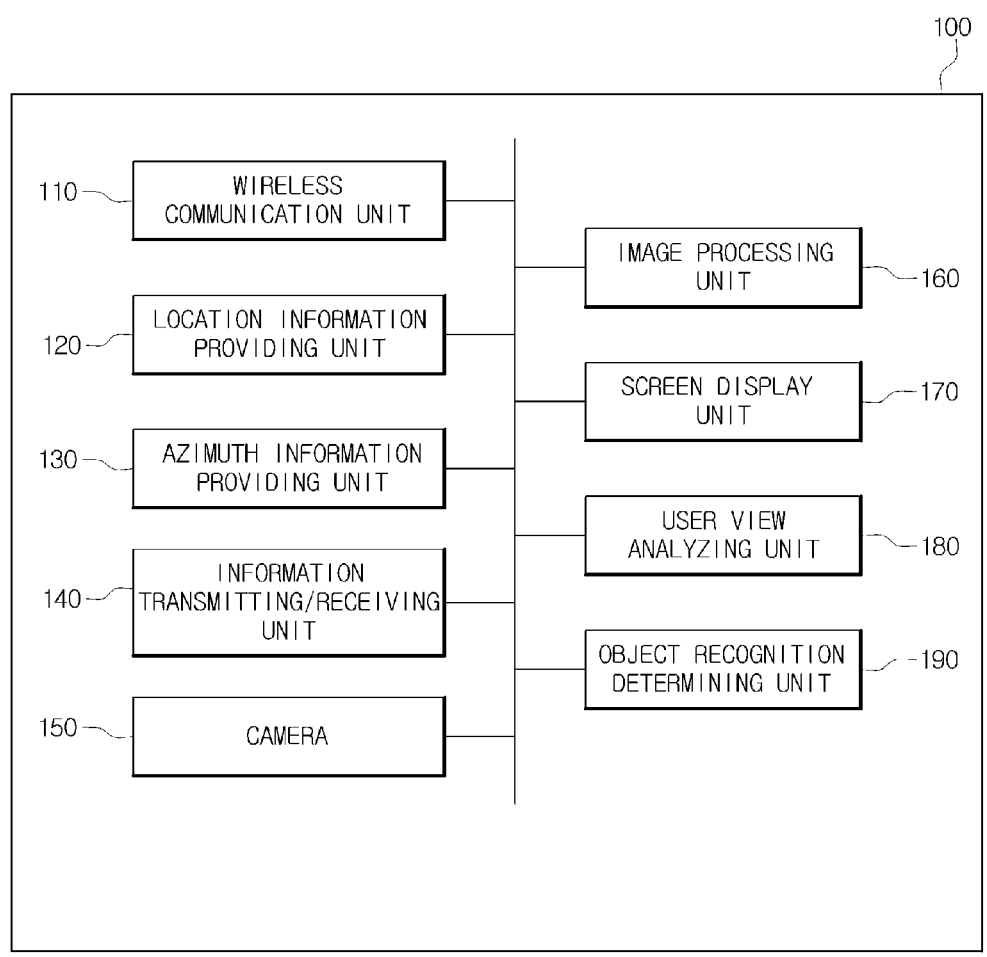
FIG. 3 is a schematic diagram illustrating a terminal to provide augmented reality according to an exemplary embodiment of the invention.

FIG. 3 is a schematic diagram illustrating a terminal configuration to provide augmented reality according to an exemplary embodiment of the invention.

As shown in FIG. 3, the terminal 100 includes a wireless communication unit 110, a location information providing unit 120, an azimuth information providing unit 130, a camera 150, an image processing unit 160, and a screen display unit 170 to provide augmented reality. In an example, the terminal 100 illustrated in FIG. 3 may have similar or same configuration and operations as the wireless communication unit 110, the location information providing unit 120, the azimuth information providing unit 130, the camera 150, the image processing unit 160, and the screen display unit 170 included in the terminal 100 illustrated in FIG. 2 and thus are denoted by like reference numerals, and detailed description thereof will be omitted.

In addition, the terminal 100 also includes an information transmitting/receiving unit 140, a user view analyzing unit 180, an object recognition determining unit 190. In an example, the information transmitting/receiving unit 140 may operate if the augmented reality mode is executed and the terminal 100 connects to the server 200 through the wireless communication unit 110. The information transmitting/receiving unit 140 may transmit location information of the terminal 100 and feature information of objects. In addition, the information transmitting/receiving unit 140 may receive object information retrieved based on the location information of the terminal 100 and the feature information of objects. The information transmitting/receiving unit 140 transmits the received object information to the image processing unit 160.

The information transmitting/receiving unit 140 may also transmit azimuth information provided from the azimuth information providing unit 130. In an example, the azimuth information may be transmitted if the information transmitting/receiving unit 140 transmits the location information of the terminal 100 and the feature information of the objects to the server 200. In addition, the azimuth information may be transmitted independent of the location information or the feature information.

An object recognition determining unit 190 may check to determine whether object information requested from the server 200 is available. If the received object information is determined to be available, the terminal 100 may obtain a distance between the terminal 100 and an object found in the real-world image based on the location information of the object and set this distance as a reference distance.

If the object information received from the server 200 corresponds to more than one object, the object recognition determining unit 190 may obtain an average distance between the terminal 100 and objects found in the real-world image based on the location information of the objects, and may set the average distance as a reference distance.

Further, in the case where the object information received from the server 200 corresponds to more than one object, the terminal 100 may designate an object among multiple objects found in the real-world image as a reference object. In an example, the reference object may be designated according to a received user input or automatically according to one or more conditions (i.e., nearest object to the terminal 100). In an example, the object recognition determining unit 190 may recognize an object designated by the user to be a reference object among the multiple objects, obtain a distance between the terminal 100 and the reference object based on the location information of the reference object, and set a reference distance to the reference object from the location of the terminal 100.

If the zooming level of the camera is increased by a user in the augmented reality mode, the user view analyzing unit 180 may calculate a virtual movement location of the terminal 100 based on the reference distance and the increased zooming level. In addition, the user view analyzing unit 180 may extract feature information of objects displayed on the enlarged real-world image corresponding to the increased zooming level, and transmit the feature information to the information transmitting/receiving unit 140 along with the virtual movement location.

In an example, if the object information requested from the server 200 determined to be unavailable based on the checking result of the object recognition determining unit 190, the user view analyzing unit 180 may not change the current location information of the terminal 100.

Figure 4:
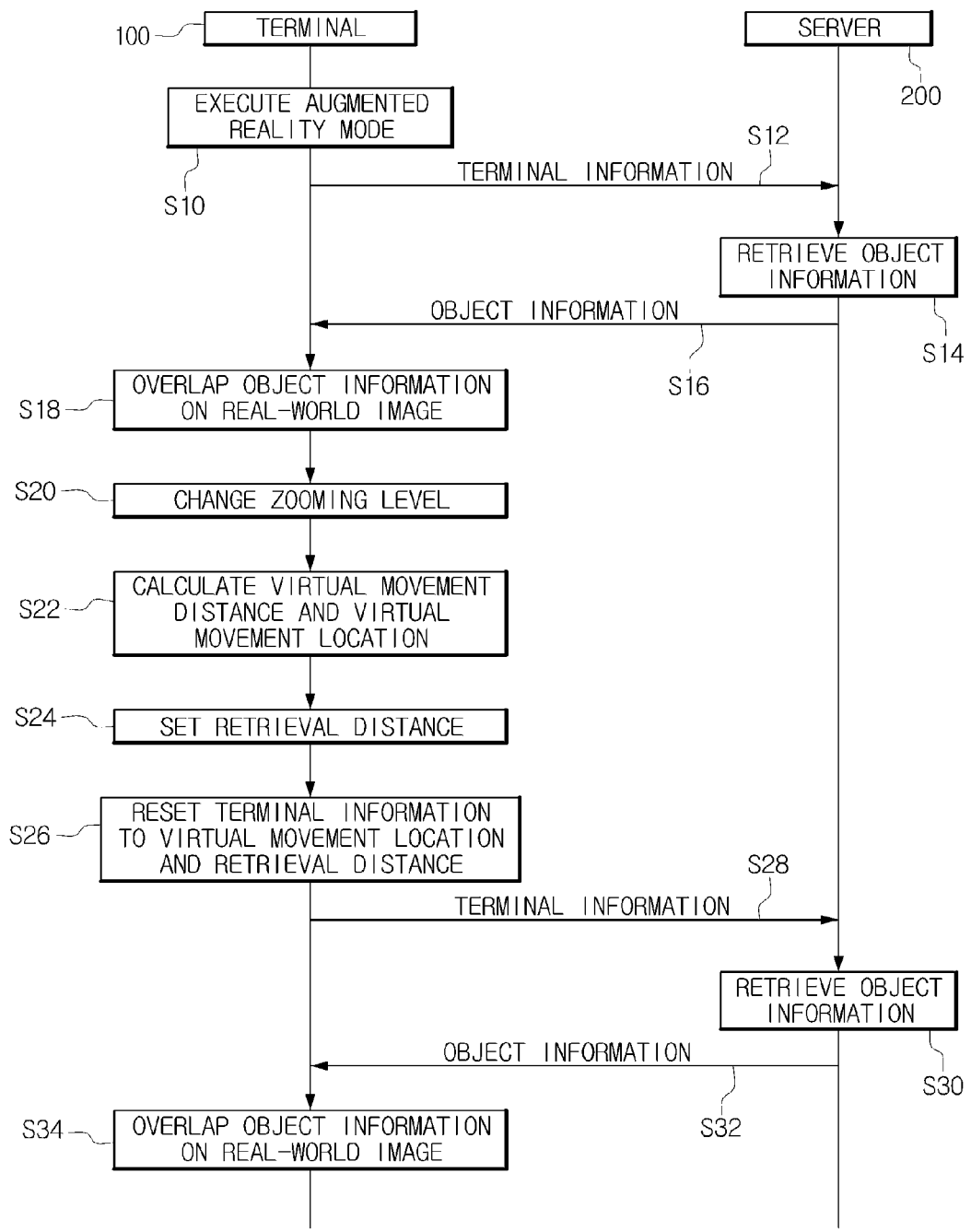
FIG. 4 is a process diagram illustrating a method for providing augmented reality according to an exemplary embodiment of the invention.

FIG. 4 is a process diagram illustrating a method for providing augmented reality according to an exemplary embodiment of the invention. The method will be described with reference to FIG. 5, FIG. 6, FIG. 7, FIG. 8, FIG. 9 and FIG. 10.

If the terminal 100 is connected to the server 200 as the augmented reality mode in the terminal 100 is executed (S10), the terminal 100 may transmit terminal information to the server 200 (S12). In an example, the terminal information may include the location information (i.e., GPS-based location information, location information received from a cellular network, or other suitable technologies) of the terminal 100 and an original retrieval distance. In an example, the original retrieval distance may be automatically set based on one or more conditions or set by the user.

In operation S12, the terminal 100 may also transmit current azimuth information and the viewing angle information of the terminal 100 in the terminal information.

The server 200 receives the terminal information from the terminal 100 (S12), retrieves object information based on the received terminal information (S14), and transmits the retrieved object information to the terminal 100 (S16).

Figure 5:
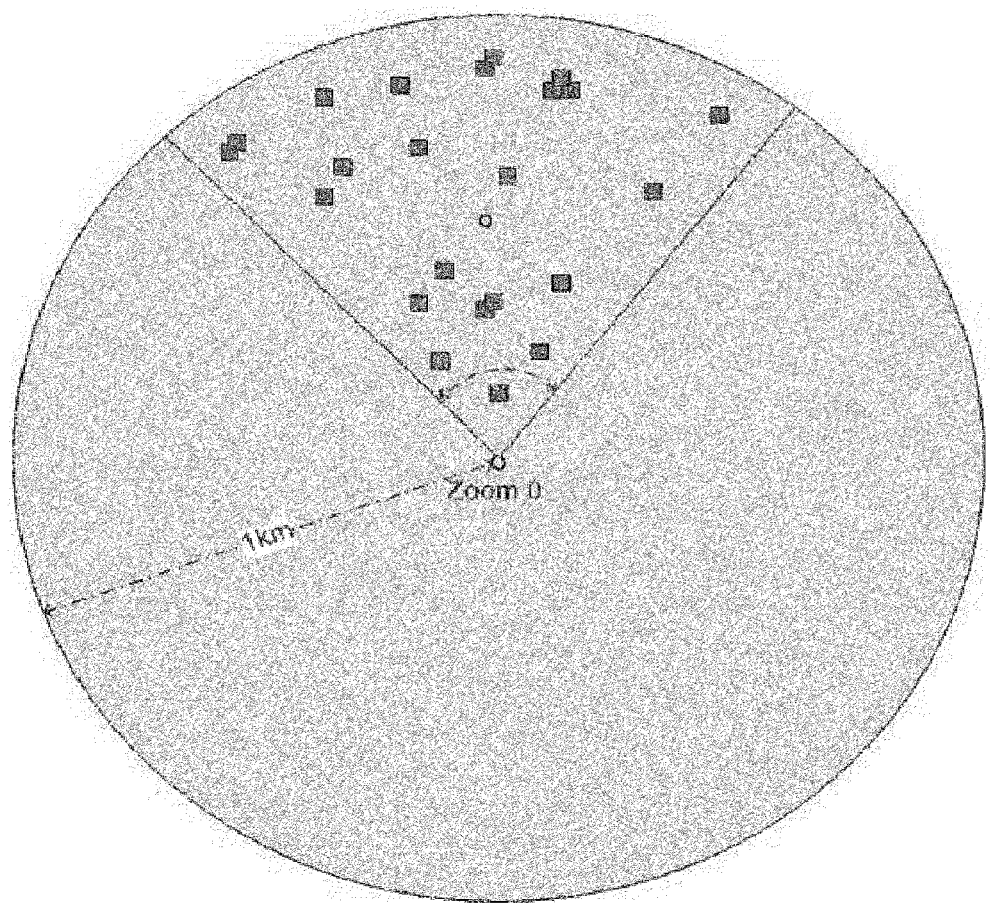
FIG. 5 is a figurative diagram illustrating a method for providing augmented reality according to an exemplary embodiment of the invention.

A retrieval range may be determined based on at least one of the retrieval distance (original or new), the location information (image capturing location or virtual movement location), the azimuth information, viewing angle information, and zooming level. In an example, the retrieval range may specify an area or a range of distance within the captured image, for which the object information may be requested to the server. An exemplary retrieval range may specify the objects found within a physical range of distance or area with respect to the azimuth information of the terminal 100 to be retrieved. An example of a retrieval range is illustrated in FIG. 5.

Figure 6:
FIG. 6 is a graphic illustration of a method for providing augmented reality according to an exemplary embodiment of the invention.

The terminal 100 that receives the object information in operation S16, overlaps the received AR object information on a real-world image, which may be captured in real-time through the camera 150, on the screen display unit 170 (S18). An example of object information overlapping the real-world image is illustrated in FIG. 6. As shown in FIG. 6, the object information, which may be provided as virtual information is overlaid on real-world objects. For example, a virtual icon with a knife and fork may be overlaid on a restaurant.

The terminal 100 may extract object information for the objects found in the direction in which the terminal 100 is facing based on the current azimuth information (S18). In an example, the object information for the respective objects may be received from the server 200.

Thereafter, if the zooming level of the camera 150 is changed by the user (S20), the user view analyzing unit 180 of the terminal 100 calculates the corresponding virtual movement distance and the virtual movement location based on the original retrieval distance and the changed zooming level (S22).

In an example, if the original retrieval distance is 1 km and the number of zooming levels includes a total of 5 levels, the virtual movement distance of the terminal 100 for each zooming level may be 200 m. Accordingly, if the zooming level is increased by 3 levels, the terminal 100 virtually moves 600 m in the zooming direction from the current location. As such, once the virtual movement distance is obtained, the virtual movement location may be obtained.

After the virtual movement distance and the virtual movement location are calculated (S22), a new retrieval distance is set (S24). In an example, the new retrieval distance may be calculated by subtracting the virtual movement distance from the original retrieval distance. Accordingly, the new retrieval distance set in operation S24 is 400 m, which may be calculated by subtracting the virtual movement distance of 600 m from the original retrieval distance of 1 km.

Thereafter, the terminal information is reset with respect to the virtual movement location obtained in operation S22 and the new retrieval distance is set in operation S24. The reset terminal information is transmitted to the server 200 (S28).

The server 200 that receives the reset terminal information from the terminal 100 in the operation S28 retrieves object information based on the reset terminal information (S30) and transmits the retrieved object information to the terminal 100 (S32).

Figure 7A:
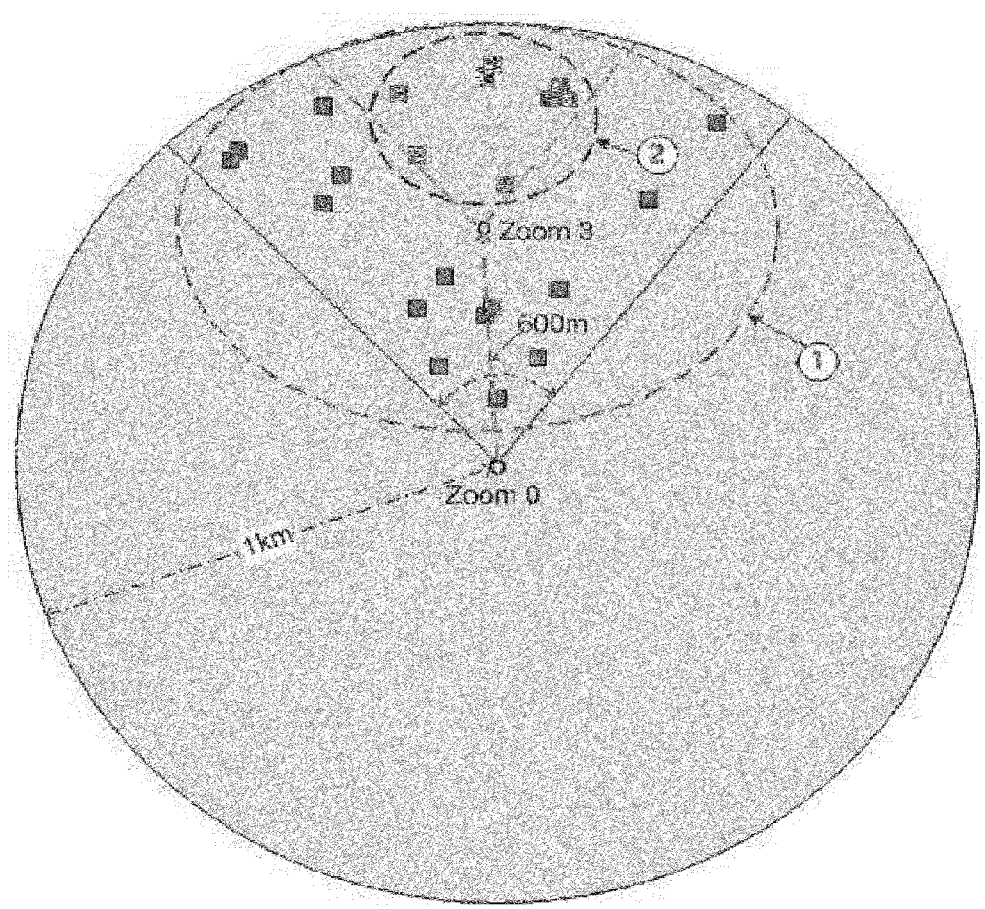
FIG. 7A and FIG. 7B are figurative diagrams illustrating a method for providing augmented reality according to an exemplary embodiment of the invention.
Figure 7B:
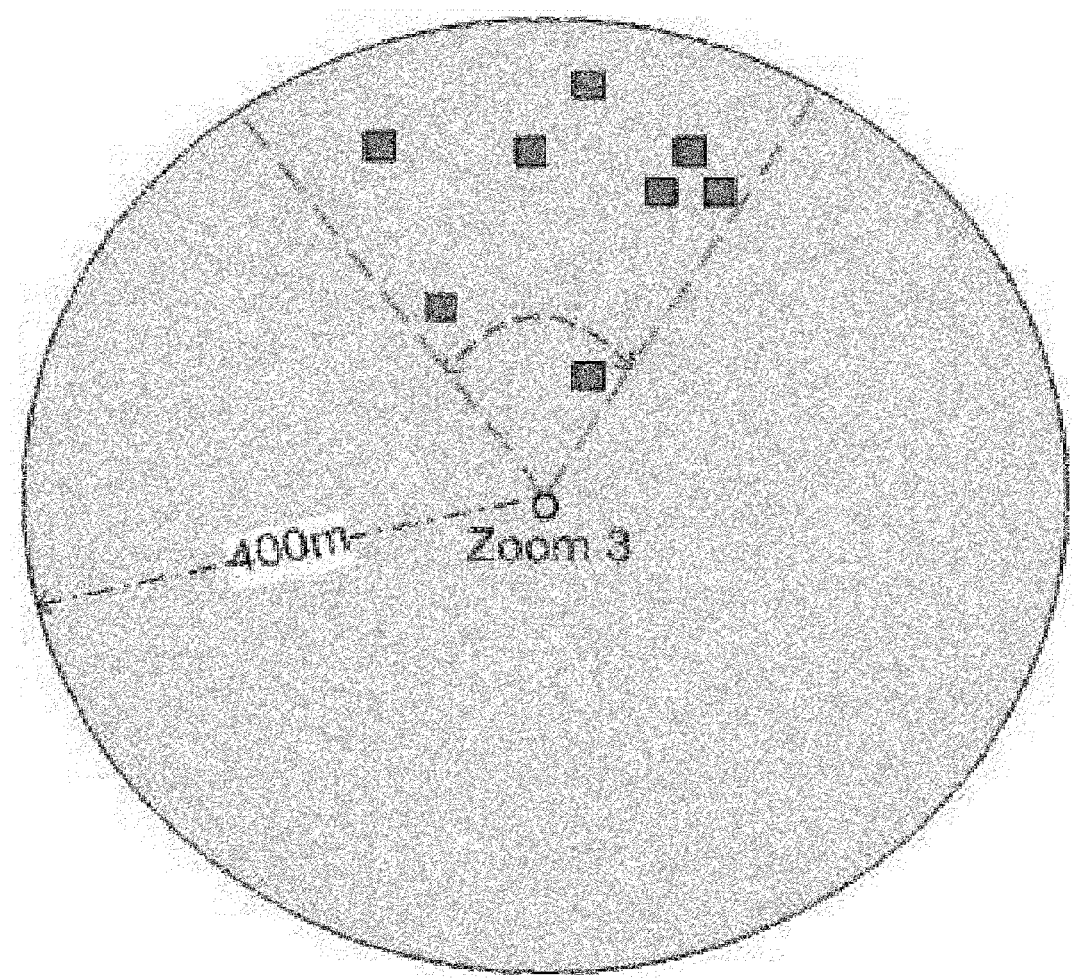

A new retrieval range of objects to be retrieved by the server 200 may be modified based on the reset terminal information (the virtual movement location, the new retrieval distance, the azimuth information, and the viewing angle information of the camera), which may be different in comparison to the terminal information before the zooming level was changed. The retrieval ranges based on the original terminal information and the reset terminal information are illustrated in FIG. 7A. More specifically, the original retrieval range based on the terminal information is indicated by ① and the new retrieval range based on the reset terminal information is indicated by ②. FIG. 7B illustrates the new retrieval range based on the reset terminal information.

As illustrated in FIG. 7A, the terminal 100 virtually moves up 600 m according to the changed zooming level (zoom 3). Accordingly, object information corresponding to objects located between the image capturing location (zoom 0) of the terminal 100 and the virtual movement location (zoom 3) of the terminal 100 may no longer belong to the new retrieval range and is thus filtered from display. As a result, only object information corresponding to objects that belong to the viewing angle at the virtual movement location (zoom 3) may be retrieved as illustrated in FIG. 7B.

Figure 8:
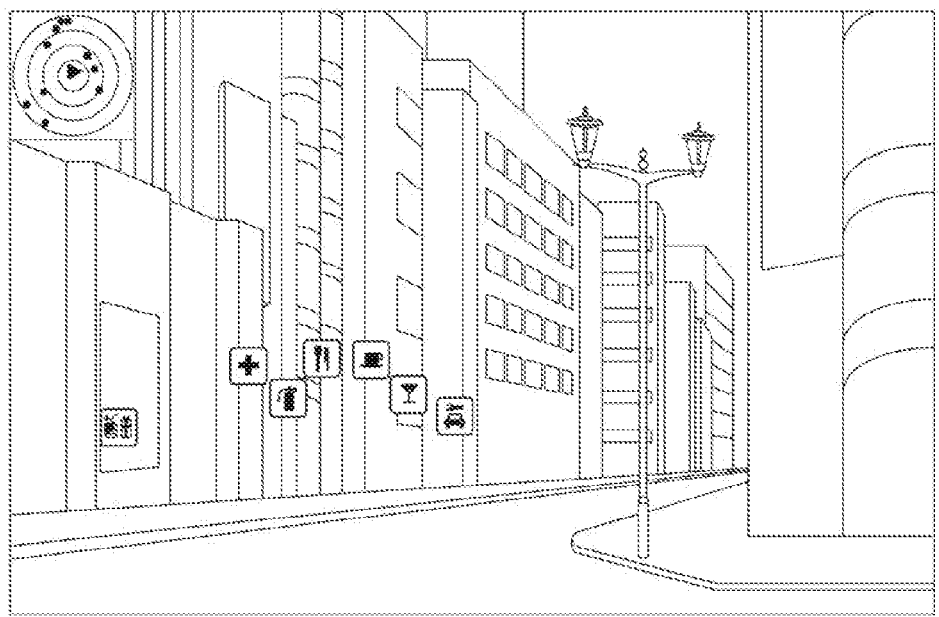
FIG. 8 is a graphic illustration of a method for providing augmented reality according to an exemplary embodiment of the invention.

The terminal 100 that receives the object information retrieved based on the reset terminal information from the server 200 in the operation S32. The terminal 100 overlaps the received object information on the real-world image, which may be captured in real-time through the camera 150, and displayed on the screen display unit 170 (S34). An example of object information for the new retrieval range overlapping the real-world image is illustrated in FIG. 8.

As described above, if the zooming level is increased in the augmented reality mode through a camera zooming operation, the preview real-world image may be enlarged according to the increased zooming level and the location of the terminal 100 may be virtually moved to be closer to the objects. As a result, the object information viewed at the virtual movement location can be checked in comparison to the object information originally viewed before changing the zooming level. Accordingly, the object information existing between the image capturing location and the virtual movement location may be filtered from view. Further, as illustrated in FIG. 8, object information that was previously hidden by other object information and could not be properly displayed (as seen in FIG. 6) is now seen without obstruction. In addition, because the distance from far objects is reduced, and object information that were formerly overlapping object information belonging to nearer objects are separated from each other and thus seen. Accordingly, the object information for the objects that are located further from the terminal 100 can be checked more easily.

Figure 9:
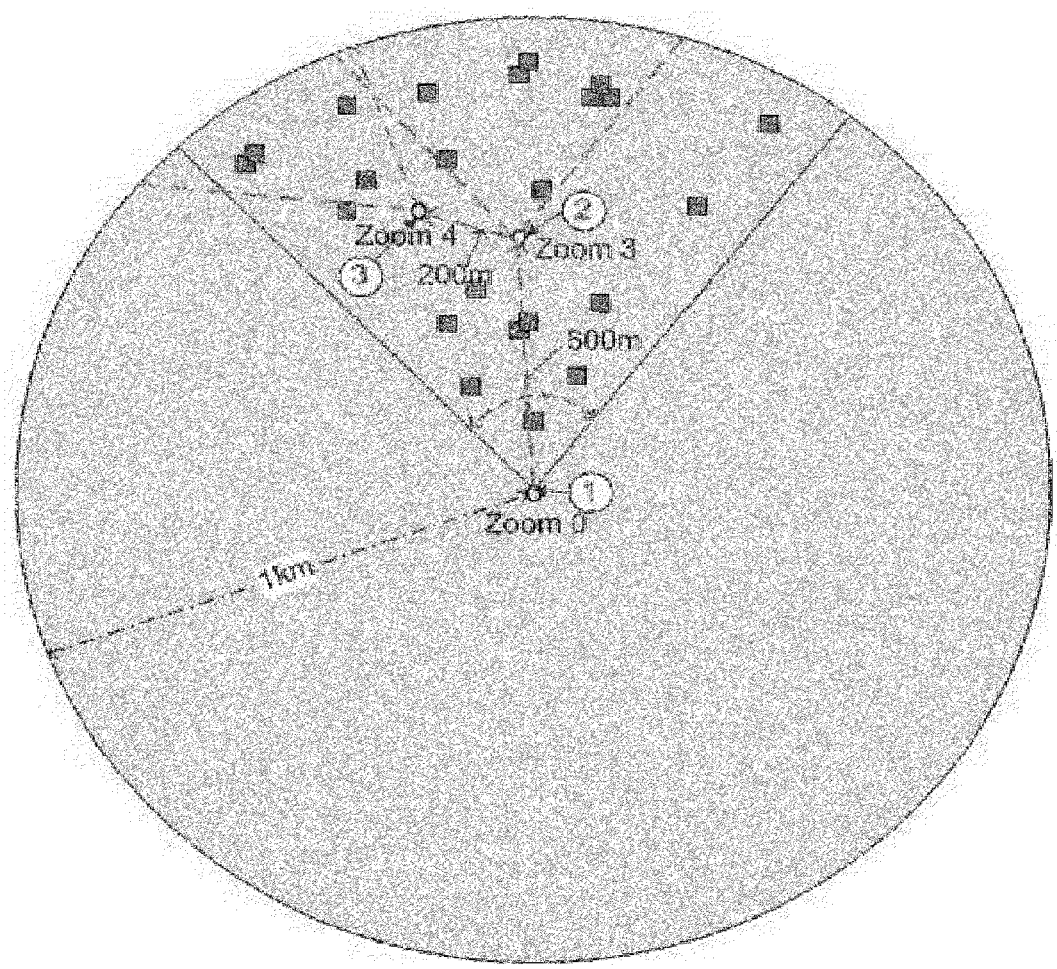
FIG. 9 is a figurative diagram illustrating a method for providing augmented reality according to an exemplary embodiment of the invention.

In FIG. 9, the terminal 100 capturing object information at various locations is illustrated. More specifically, at location 1 (zoom 0), the terminal 100 obtains object information from the image capturing location. At location 2 (zoom 3), the terminal obtains object information for the objects located within the new retrieval range corresponding to the changed zooming level (zoom 3). At location 3 (zoom 4), the terminal 100 changes direction of view and zooms in further to provide a different retrieval range. As described above, if the terminal 100 changes the direction of the camera from location 2 and operates the zoom again, the terminal 100 may change the facing direction of the camera from location 2 and virtually move the terminal 100 to location 3. If the zoom level was increased by 1 level from location 2 in the changed direction, the terminal 100 virtually moves to location 3 from location 2 by 200 m in the changed facing direction of the terminal 100. The retrieval distance at this time may be 200 m, which may be calculated by subtracting the virtual movement distance of 200 m from the retrieval distance of 400 m at location 2.

Figure 10:
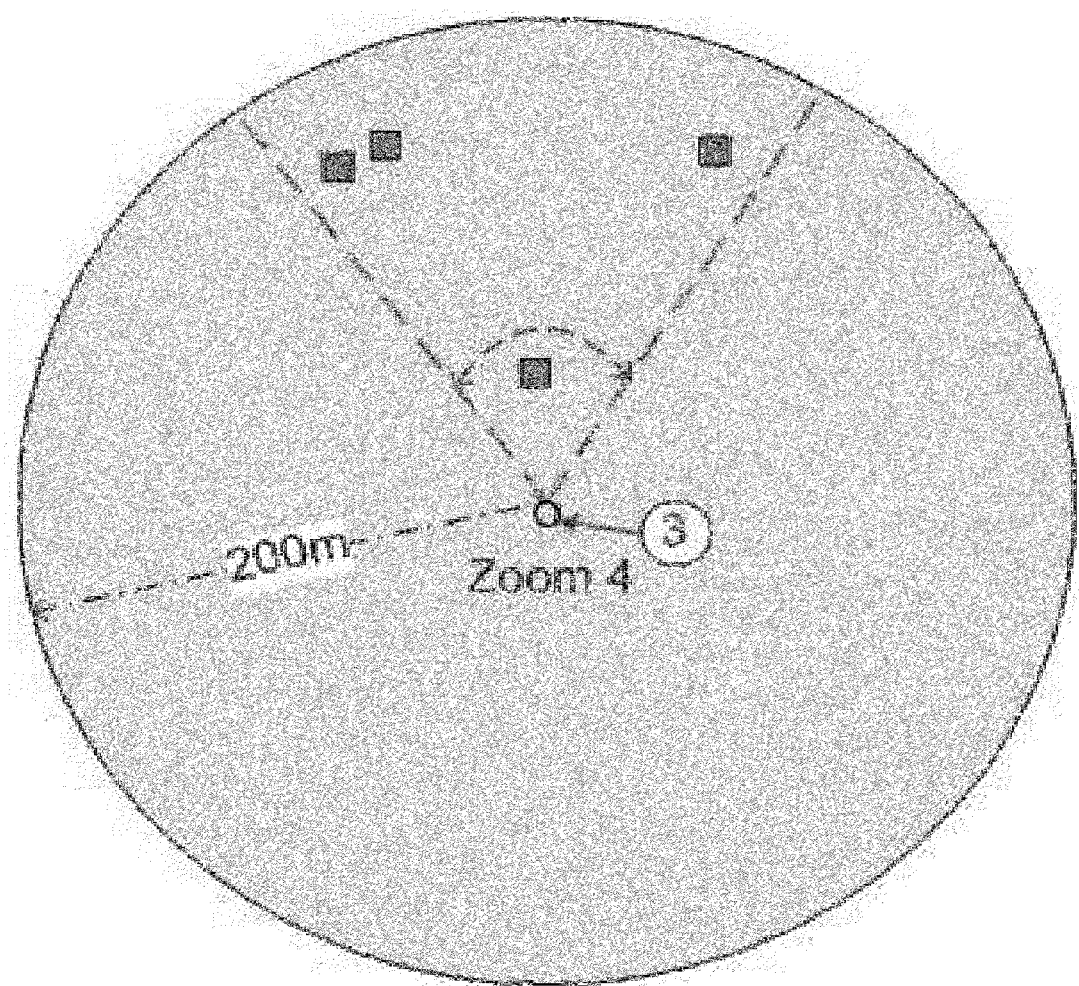
FIG. 10 is a figurative diagram illustrating a method for providing augmented reality according to an exemplary embodiment of the invention.

As such, if the virtual location of the terminal 100 virtually moves to location 3, object information for objects located within the retrieval range corresponding to location 3 may be retrieved. This retrieval range may have a different direction and may be based from a different location than the retrieval range found at location 2. Accordingly, the object information for the object retrieved at location 3 may be different from the object information retrieved at location 2. Further, the object information for objects found at location 3 may be retrieved from the preview real-world image, which may be captured in real-time, displayed on the terminal 100 at location 3 as illustrated in FIG. 10.

Figure 11:
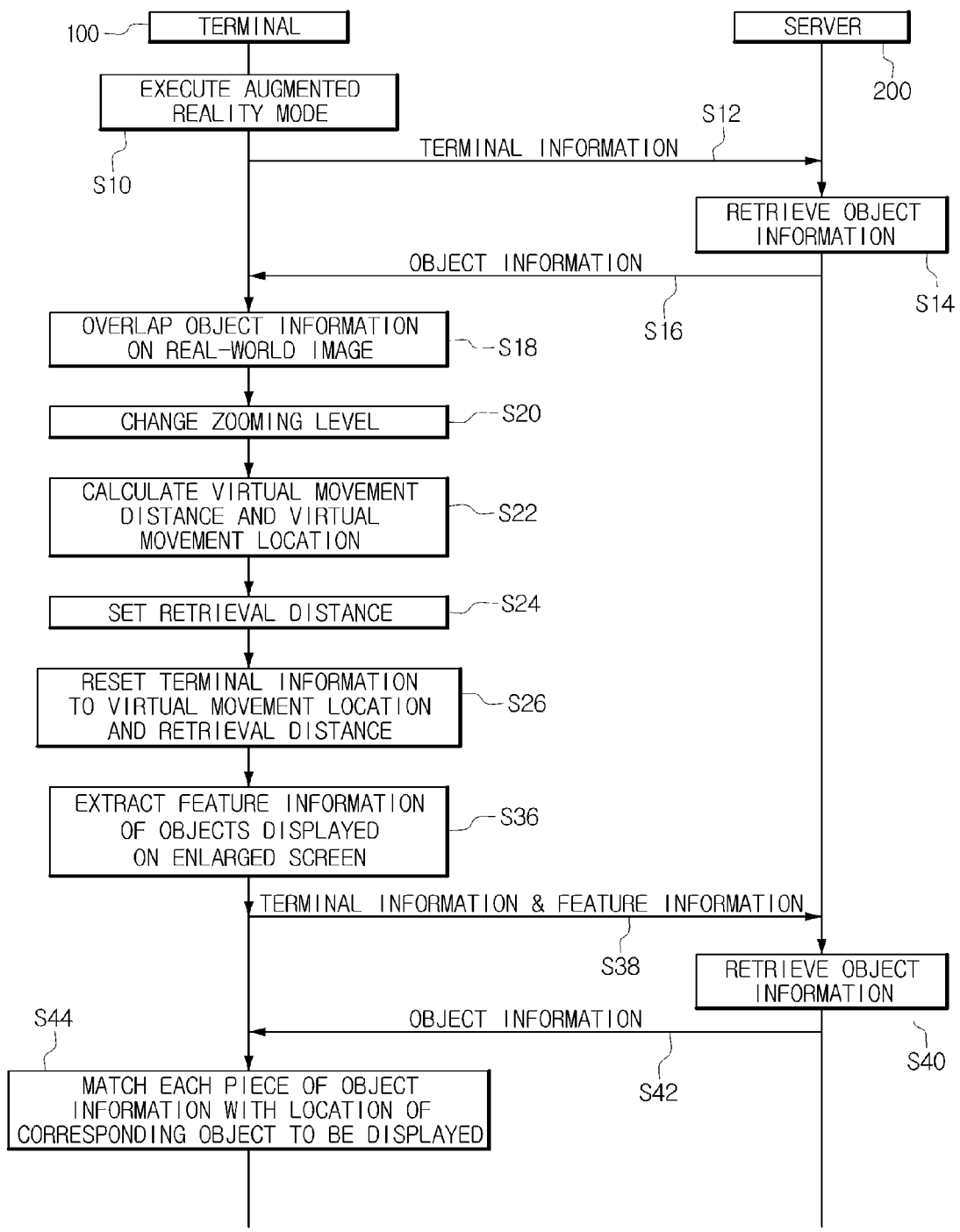
FIG. 11 is a process diagram illustrating a method for providing augmented reality according to an exemplary embodiment of the invention.

FIG. 11 is a process diagram illustrating a method for providing augmented reality according to an exemplary embodiment of the invention. The method will be described with reference to FIG. 12.

Operations S10, S12, S14, S16, S18, S20, S22, S24 and S26 are similar or the same as those described above. Accordingly, detailed description thereof will be omitted.

The terminal information is reset as the zooming level is changed in operation S20, and the terminal 100 extracts feature information of one or more objects displayed on the enlarged (if the zooming level is changed to be increased) real-world image (S36).

The terminal 100 transmits the terminal information reset (S26) and the feature information of one or more objects displayed in the real-world image (S36) to the server 200 (S38).

The server 200 receives the reset terminal information and the feature information from the terminal 100 (S38), retrieves object information based on the reset terminal information and the feature information (S40), and transmits the retrieved object information to the terminal 100 (S42).

The new retrieval range to be retrieved by the server 200 in operation S40 based on the reset terminal information (e.g., the virtual movement location, the new retrieval distance, the azimuth information, and the viewing angle information of the camera) and the feature information may be narrowed in comparison to the original retrieval range set before the zooming level was changed. The retrieval ranges based on the original terminal information and the reset terminal information is illustrated in FIG. 7A. FIG. 7B illustrates the new retrieval range based on the reset terminal information. Accordingly, if the new retrieval range is narrowed according to the changed zooming level, the number of objects to be compared and retrieved may be reduced, so that the object recognition speed may be increased.

Figure 12:
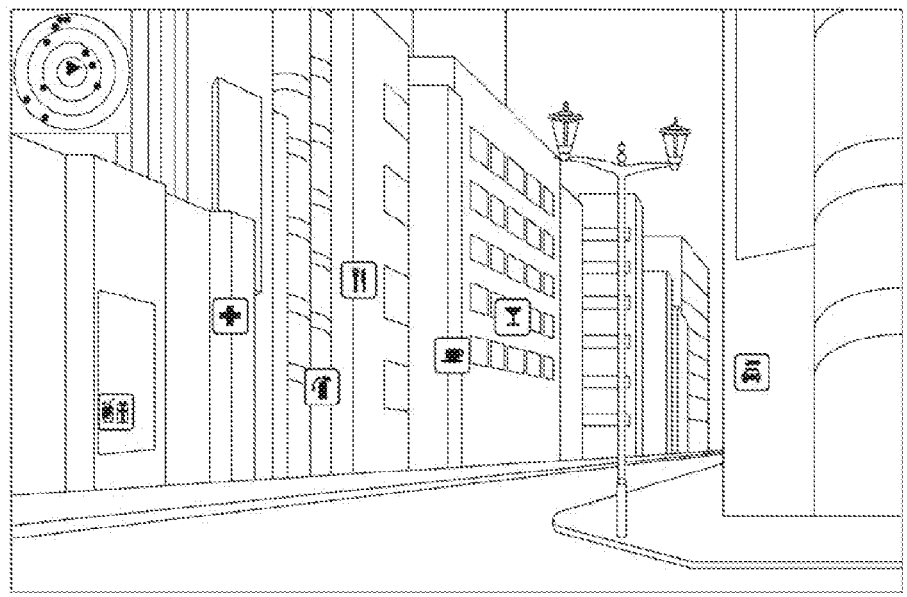
FIG. 12 is a graphic illustration of a method for providing augmented reality according to an exemplary embodiment of the invention.

The terminal 100 receives the object information retrieved based on the reset terminal information and the feature information of one or more objects from the server 200 in operation S42. In operation S44, the terminal 100 overlaps the received object information on the real-world image, which may be captured in real-time through the camera 150, to be displayed on the screen display unit 170 as illustrated in FIG. 12 (S44). As a result, each piece of the object information is matched with a location of a corresponding object.

Figure 13A:
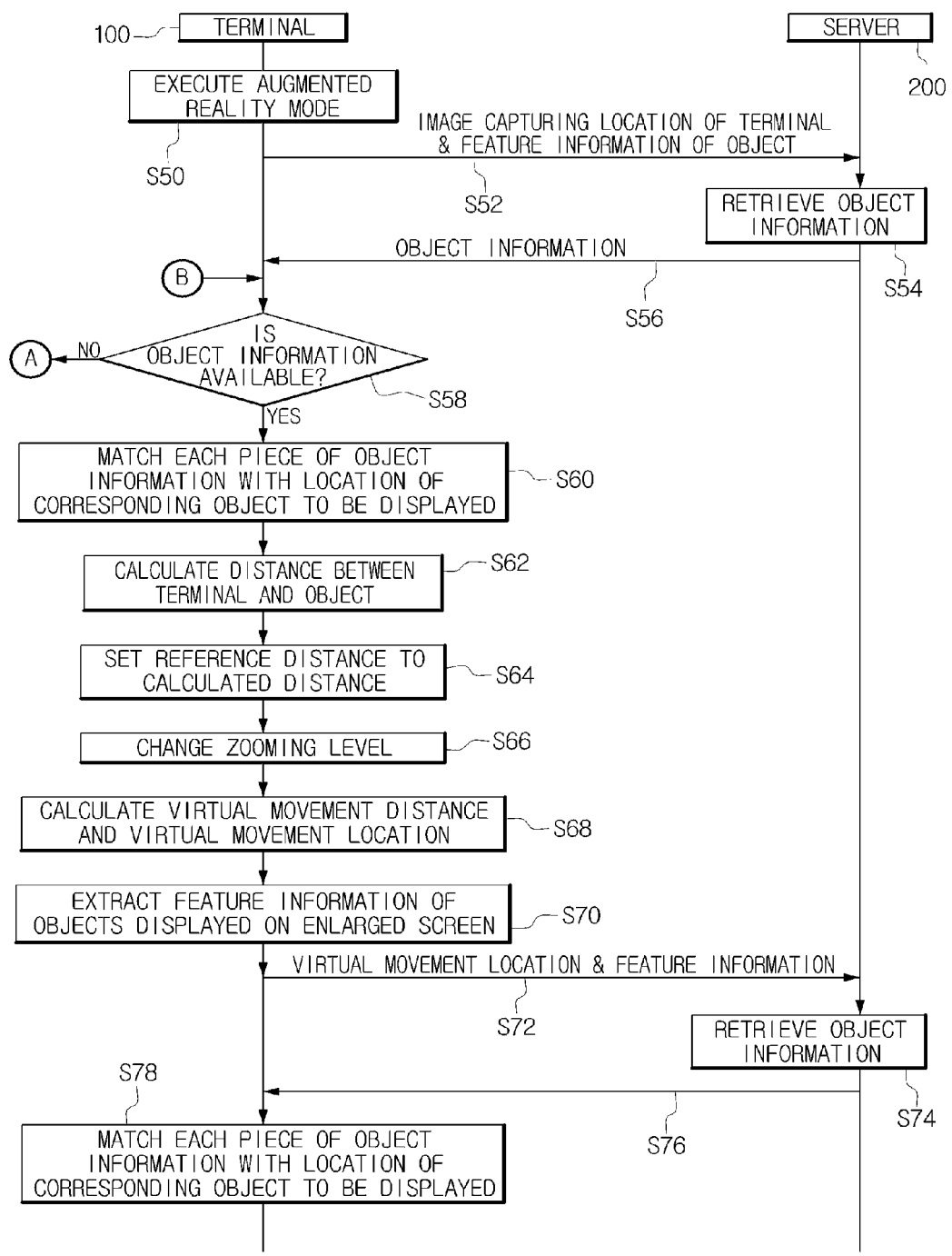
FIG. 13A and FIG. 13B are process diagrams illustrating a method for providing augmented reality according to an exemplary embodiment of the invention.
Figure 13B:
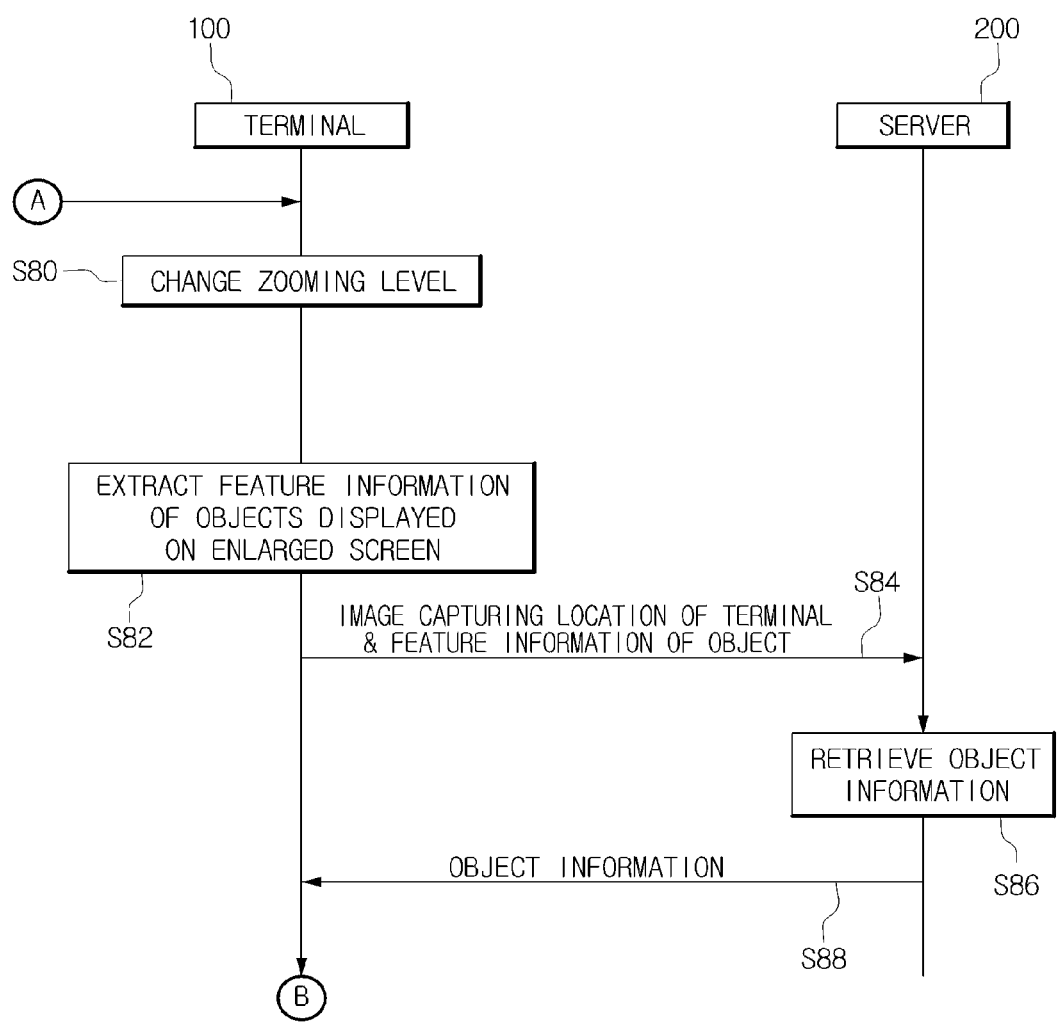

FIG. 13A and FIG. 13B are process diagrams illustrating a method for providing augmented reality according to an exemplary embodiment of the invention. The method will be described with reference to FIG. 14.

If the terminal 100 is connected to the server 200 as the augmented reality mode in the terminal 100 is executed (S50), the terminal 100 may transmit the location information (e.g., GPS-based location information, location information received from a cellular network, and other suitable location information providing technologies) of the terminal 100 and the feature information of one or more objects displayed on the real-world image, to the server 200 (S52).

In operation S52, the terminal 100 may transmit the current azimuth information, the location information of the terminal 100, and the feature information of one or more objects to the server 200.

The server 200 receives the current location information of the terminal 100 and the feature information of one or more objects (S52), retrieves object information based on the received location information of the terminal 100 and the feature information of one or more objects (S54), and transmits the retrieved object information to the terminal 100 to provide augmented reality (S56).

Figure 14:
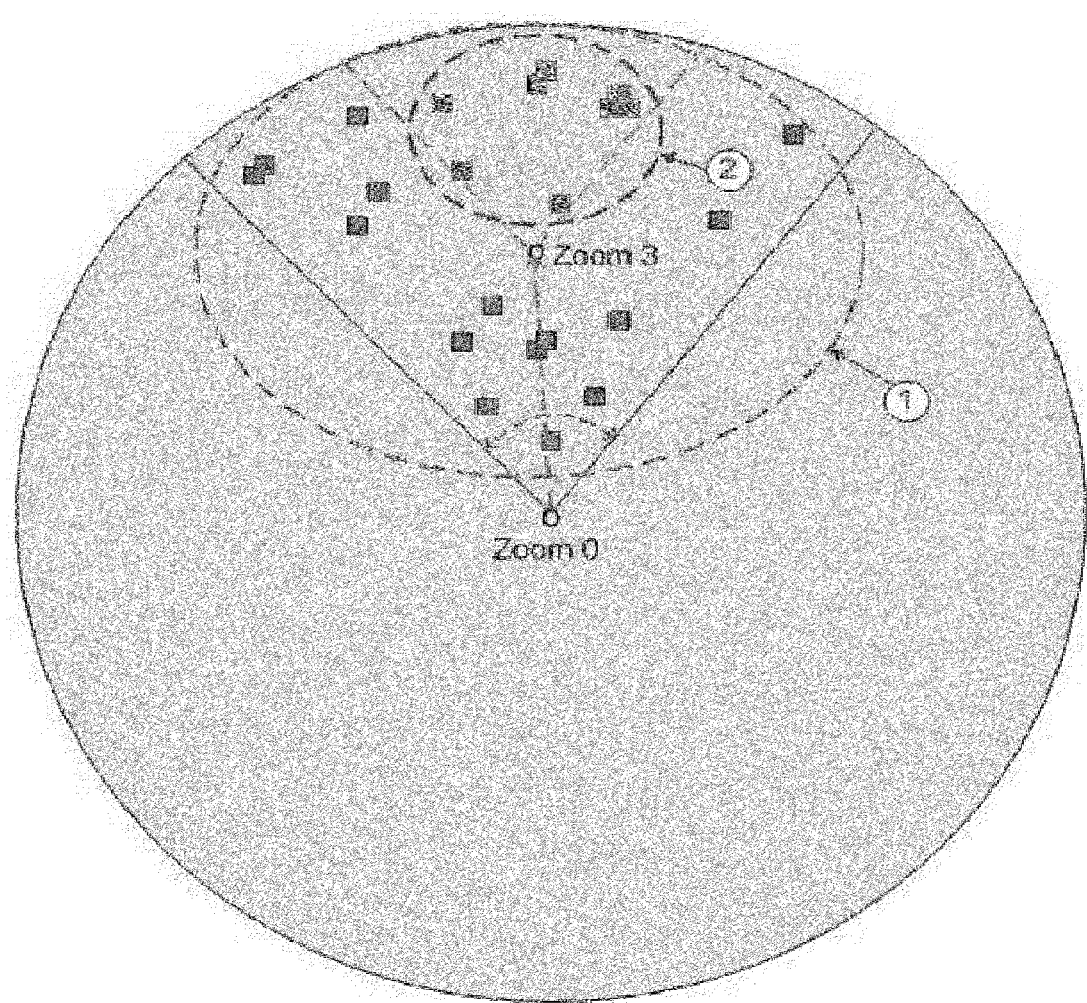
FIG. 14 is a figurative diagram illustrating a method for providing augmented reality according to an exemplary embodiment of the invention.

The original retrieval range to be retrieved by the server 200 in operation S54 is illustrated by ① in FIG. 14. If the zooming level is changed to zoom 3, the new retrieval range to be retrieved by the server 200 may be changed in accordance to the changed location as illustrated by ② in FIG. 14.

The terminal 100 receives the object information retrieved based on the location information of the terminal 100 and the feature information of one or more objects from the server 200 (S56), and overlaps the received object information on the real-world image, which may be acquired in real-time though the camera 150, to be displayed on the screen display unit 170. In an example, the terminal 100 may also check to determine whether the object information requested from the server 200 is available (S58). If the object information requested from the server 200 is available, the terminal 100 receives the requested object information and overlaps the received object information over the real-world image, which may be captured in real-time through the camera 150, on the screen display unit 170 (S60). As a result, object information is matched with a location of a corresponding object. The terminal 100 calculates a distance between the terminal 100 and the object based on the location information of the object included in the received object information (S62), and sets calculated distance as the reference distance (S64).

In a case where the number of object information received from the server 200 in the operations S62 and S64 is more than one, the terminal 100 may obtain an average distance between the terminal 100 and objects based on the location information of the objects included in the received object information and set the average distance as the reference distance.

Thereafter, if the zooming level of the camera 150 is changed (S66), the terminal 100 calculates the virtual movement distance and the virtual movement location of the terminal 100 based on the changed zooming levels (S68).

In an example, if the reference distance is 620 m and the number of zooming levels includes a total of 5 levels, the virtual movement distance of the terminal 100 for each zooming level may be 124 m. Accordingly, if the zooming level is increased by 3 levels, the terminal 100 virtually moves 372 m in the direction of the zoom from the current location. As such, when the virtual movement distance is obtained, the new location information corresponding to the virtual movement location may be obtained.

Thereafter, the terminal 100 extracts the feature information of the objects displayed on the enlarged image as the zooming level is changed (S70), and transmits the virtual movement location obtained in the operation S68 and the feature information extracted in the operation S70 to the server 200 (S72).

The server 200 receives the virtual movement location of the terminal 100 and the feature information of one or more objects from the terminal 100 (S72), retrieves object information based on the virtual movement location of the terminal 100 and the feature information (S74), and transmits the retrieved object information to the terminal 100 to provide augmented reality (S76).

With reference to FIG. 14, if the zooming level is changed from zoom 0 to zoom 3, the new retrieval range to be retrieved by the server 200 in operation S74 may be narrowed as illustrated by ② in FIG. 14. In comparison, if the zooming level is not changed from zoom 0, the original retrieval range will remain the same as illustrated by ① in FIG. 14. Accordingly, the number of objects to be compared and retrieved may be reduced if the zooming level is increased, and the object recognition speed can be increased.

The terminal 100 receives the object information retrieved based on the virtual movement location of the terminal 100 and the feature information from the server 200 in operation S76. The terminal 100 overlaps the received object information on the real-world image, which may be captured in real-time through the camera 150, on the screen display unit 170 (S78). As a result, the object information is matched with a location of a corresponding object.

In the case where object information requested from the server 200 is not available according to the checking result in operation S58, the terminal 100 does not receive object information. Accordingly, corresponding object information may not overlap one or more objects on the real-world image displayed on the screen display unit 170.

With reference to FIG. 13B, if it is determined that the object information requested from the server 200 is not available in operation S58 of FIG. 13A, the zooming level of the camera 150 is changed (S80). The terminal 100 extracts feature information of objects displayed on the enlarged real-world image (S82), and transmits the location information of the terminal 100 and the feature information extracted in the operation S82 to the server 200 (S84).

The server 200 receives the current location information of the terminal 100 and the feature information extracted from the enlarged real-world image from the terminal 100 (S84), retrieves object information based on the location information of the terminal 100 and the feature information extracted from the enlarged image (S86), and transmits the retrieved object information to the terminal 100 to provide augmented reality (S88).

The terminal 100 receives the object information retrieved based on the location information of the terminal 100 and the feature information extracted from the enlarged real-world image from the server 200 in operation S86. In addition, the terminal 100 may also check to determine whether the object information requested from the server 200 is available (S58).

In the case where the object information requested from the server 200 is available, the operations S60, S62, S66, S68, S70, S72, S74, S76, and S78 may be repeated. In the case where the object information requested from the server 200 is not available, the operations S80, S82, S84, S86 and S88 may be repeated.

Figure 15:
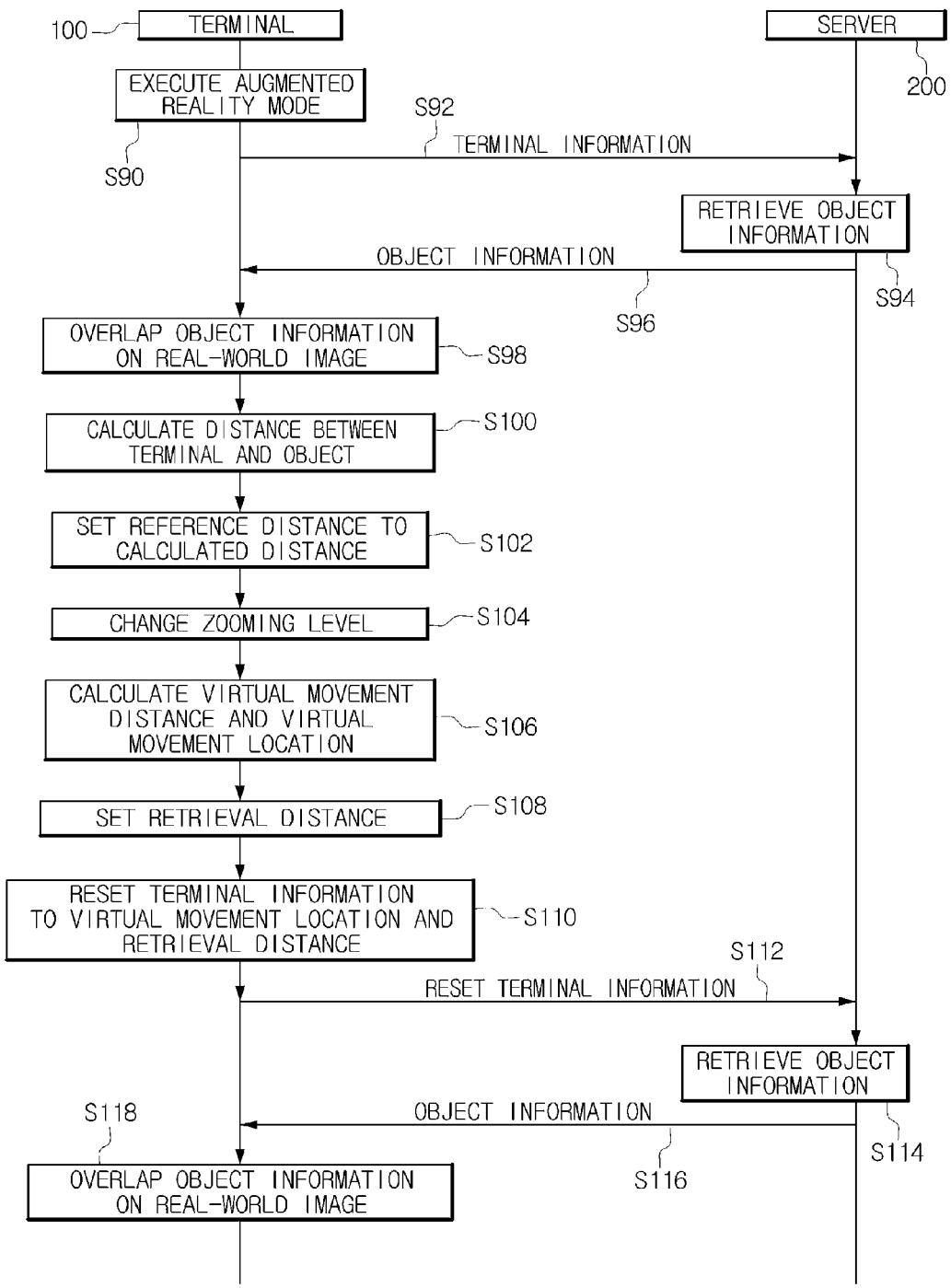
FIG. 15 is a process diagram illustrating a method for providing augmented reality according to an exemplary embodiment of the invention.

FIG. 15 is a process diagram illustrating a method for providing augmented reality according to an exemplary embodiment of the invention.

If the terminal 100 is connected to the server 200 as the augmented reality mode in the terminal 100 is executed (S90), the terminal 100 transmits the terminal information including the location information (e.g., GPS-based location information, location information received from a cellular network, or other suitable location information providing technologies) of the terminal 100 and the original retrieval distance (S92) to the server 200.

The server 200 receives the terminal information from the terminal 100 in operation S92 retrieves object information based on the terminal information (S94), and transmits the retrieved object information to the terminal 100 (S96).

The terminal 100 receives the object information from the server 200 in operation S96. The terminal 100 overlaps the received object information on the real-world image, which may be captured in real-time and acquired through the camera 150, to be displayed on the screen display unit 170 (S98). The terminal 100 calculates a distance between the terminal 100 and the object based on the location information of the object included in the received object information (S100), and sets calculated distance as the reference distance (S102).

In the case where the number of object information received from the server 200 in the operations S100 and S102 is more than one, the terminal 100 may obtain an average distance between the terminal 100 and objects based on the location information of the objects included in the received object information and set the average distance as the reference distance.

Thereafter, if the zooming level of the camera 150 is changed (S104), the terminal 100 calculates the virtual movement distance and the virtual movement location of the terminal 100 based on the reference distance and the changed zooming level (S68).

In an example, if the reference distance is 890 m and the number of zooming levels includes a total of 5 levels, the virtual movement distance of the terminal 100 for each zooming level may be 178 m. Accordingly, if the zooming level is increased by 3 levels, the terminal 100 virtually moves 534 m in the direction of the zoom from the current location. As such, when the virtual movement distance is obtained, the new location information corresponding to the virtual movement location may be obtained.

Thereafter, the terminal 100 sets the distance obtained by subtracting the virtual movement distance from the original retrieval distance as a new retrieval distance (S108). Accordingly, the new retrieval distance set in the operation S108 is 356 m, which may be obtained by subtracting the virtual movement distance of 534 m from the original retrieval distance of 890 m.

Thereafter, the terminal information is reset according to the virtual movement location obtained in operation S106 and the new retrieval distance set in operation S108. The reset terminal information is transmitted to the server 200 (S112).

The server 200 receives the reset terminal information (S112), retrieves object information based on the reset terminal information (S114), and transmits the retrieved object information to the terminal 100 to provide augmented reality (S116).

The terminal 100 receives the object information from the server 200 in operation S116. The terminal 100 overlaps the received object information on the real-world image, which may be captured in real-time through the camera 150, on the screen display unit 170 (S118).

Although not illustrated, the terminal 100 may transmit the virtual movement location of the terminal 100 obtained in operation S106 and the feature information of objects extracted from the enlarged real-world image to the server 200 instead of transmitting the reset terminal information in operation S112. Accordingly, the terminal 100 may not receive object information retrieved based on the virtual movement location of the terminal 100 and the feature information from the server 200, to overlap the object information on the real-world image.

According to the terminal and method for providing augmented reality of the present disclosure, the location of the terminal 100 may be virtually moved by a reference distance for each zooming level. In addition, the object information retrieved in the new retrieval range based on the virtual movement location of the terminal 100 is rearranged to be displayed according to the virtual movement location, so that overlapping pieces of the object information can be separated from each other to be seen. Accordingly, as the number of pieces of the object information is reduced, the object information can be checked more easily. In addition, objects that may be too small to be recognized may be seen on a preview screen by changing a zooming level. In addition, the number of objects displayed on the preview screen may be reduced by changing the zooming level, which may reduce the number of objects to be retrieved from a DB, thereby enhancing the object recognition speed. In addition, one or more piece of object information for recognized objects can be accurately matched with a location of a corresponding object to be displayed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A terminal to provide augmented reality, the terminal comprising:
   a processor;
   a location information providing unit to provide location information of a terminal at a physical location;
   an information transmitting/receiving unit to transmit terminal information corresponding to the physical location, and to receive object information retrieved based on the terminal information corresponding to the physical location;
   an image processing unit to overlap the object information on a real-world image, wherein the real-world image comprises an object corresponding to the object information; and
   a user view analyzing unit to calculate, via the processor, a virtual movement location of the terminal based on a zooming level, to transmit terminal information corresponding to the virtual movement location, and to receive object information retrieved based on the terminal information corresponding to the virtual movement location.

2. The terminal of claim 1, wherein the terminal information comprises at least one of location information of the terminal, an original retrieval distance, and azimuth information of the terminal.

3. The terminal of claim 1, wherein the location information providing unit provides at least one of cellular network-based location information and GPS information-based location information.

4. The terminal of claim 1, further comprising a camera unit having a zooming operation to obtain the real-world image, wherein if the zooming level of the camera unit is changed, the user view analyzing unit resets the terminal information according to the virtual movement location, and a new retrieval distance is calculated based on the virtual movement location.

5. The terminal of claim 4, wherein the new retrieval distance is calculated by subtracting the virtual movement distance from an original retrieval distance and the terminal information is reset based on the virtual movement location and the new retrieval distance.

6. The terminal of claim 4, wherein the information transmitting/receiving unit extracts feature information of the object displayed on the real-world image corresponding to the changed zooming level, transmits the feature information along with the reset terminal information corresponding to the virtual movement location, and receives object information based on the reset terminal information and the feature information of the object, and the image processing unit matches the received object information to a location of a corresponding object to be displayed.

7. The terminal of claim 1, wherein the virtual movement distance is calculated according to a reference value, wherein the reference value is obtained by dividing an original retrieval distance by the total number of zooming levels.

8. The terminal of claim 1, wherein the user view analyzing unit calculates a distance between the location of the terminal and the object based on the location information of the object and sets the calculated distance as a reference distance, wherein the location of the terminal is an image capturing location or a virtual movement location, and the location information of the object is comprised in the received object information.

9. The terminal of claim 1, wherein the virtual movement distance is calculated according to a reference value, wherein the reference value is obtained by dividing an original retrieval distance by a number of the zoom levels.

10. The terminal of claim 1, wherein the real-world image is a real-time image.

11. The terminal of claim 8, wherein the user view analyzing unit calculates the virtual movement location of the terminal based on the reference distance and the zooming level, the information transmitting/receiving unit transmits the virtual movement location of the terminal and feature information of objects extracted from the real-world image, and receives object information based on the feature information of objects, and the image processing unit matches the received information to a location of a corresponding object to be displayed.

12. A terminal to provide augmented reality, the terminal comprising:

a processor;

a location information providing unit to provide location information of the terminal at a physical location;

an information transmitting/receiving unit to transmit the location information of the terminal and feature information of an object displayed on a real-world image, and to request and receive object information based on the location information of the terminal and the feature information of the object;

an object recognition determining unit to obtain a distance between the terminal and the object based on a location information of the object and to set the obtained distance as a reference distance, wherein the location information of the object is comprised in the received object information;

an image processing unit to overlap the object information received on the real-world image; and a user view analyzing unit to calculate, via the processor, a virtual movement location of the terminal based on the reference distance and a zooming level, to transmit the virtual movement location of the terminal and the feature information of the object, and to receive object information corresponding to the virtual movement location of the terminal.

13. The terminal of claim 12, wherein, if the number of objects displayed on the real-world image and corresponding received object information is more than one, the object recognition determining unit obtains an average distance between the terminal and the objects based on the location information of the objects comprised in the received object information, and sets the average distance as the reference distance.

14. The terminal of claim 12, wherein, if the object information requested is not available according to the result of the object recognition determining unit, the user view analyzing unit does not change the location information of the terminal even if the zooming level of the camera is changed.

15. The terminal of claim 12, wherein the real-world image is a real-time image.

16. A method for providing augmented reality, the method comprising:

acquiring a real-world image comprising an object;

transmitting terminal information, wherein the terminal information comprises a location information of a terminal and an original retrieval distance;

receiving object information corresponding to the object, wherein the object information is based on the transmitted terminal information;

overlapping the received object information over the corresponding object in the real-world image;

changing a zooming level of the real-world image for providing a second real-world image, wherein the second real-world image comprises a second object;

calculating a virtual movement location of the terminal, a virtual movement distance between the second object and the terminal, and a second retrieval distance according to the changed zooming level; and resetting the terminal information according to the virtual movement location for providing a second terminal information.

17. The method of claim 16, further comprising:

transmitting the second terminal information;

receiving second object information based on the second terminal information; and overlapping the second object information over the second object in the second real-world image.

18. The method of claim 16, further comprising:

changing a zooming level of the real-world image for providing a second real-world image, wherein the second real-world image comprises a second object;

extracting feature information of the second object displayed on the second real-world image;

calculating a virtual movement location of the terminal;

resetting the terminal information according to the virtual movement location for providing a second terminal information;

transmitting the second terminal information and the feature information;

receiving second object information based on the second terminal information and the feature information;

overlapping the second object information over the second object in the second real-world image; and displaying the overlapped image such that the second object information is matched with a location of the corresponding second object.

19. The method of claim 16, wherein the real-world image is a real-time image.

20. A method for providing augmented reality, the method comprising:
    acquiring a real-world image comprising an object using a terminal;
    transmitting location information of the terminal and feature information of the object;
    receiving object information corresponding to the object based on the location information of the terminal and the feature information of the object;
    calculating a distance between the terminal and the object based on location information of the object comprised in the received object information;
    setting the calculated distance as a reference distance;
    changing a zooming level of the real-world image for providing a second real-world image, wherein the second real-world image comprises a second object; and
    calculating a virtual movement location of the terminal based on the reference distance and the changed zooming level.

21. The method of claim 20, further comprising:
    extracting feature information of the second object from the second real-world image;
    transmitting the virtual movement location of the terminal and the feature information of the second object;
    requesting and receiving second object information based on the virtual movement location of the terminal and the feature information of the second object; and
    overlapping the second object information over the second object in the second real-world image, wherein the second object information overlaps the second object at a location of the corresponding second object.

22. The method of claim 20, further comprising:
    changing a zooming level of the real-world image for providing a second real-world image, wherein the second real-world image comprises a second object;
    calculating a virtual movement location of the terminal based on the reference distance and the changed zooming level;
    extracting feature information of the second object displayed on the second real world image;
    transmitting the virtual movement location of the terminal and feature information of objects;
    requesting second object information based on the virtual movement location of the terminal and the feature information of the second object; and
    if the requested second object information is not available, receiving object information based on the location information of the terminal and the feature information of the second object.

23. The method of claim 20, wherein the real-world image is a real-time image.

24. A method for providing augmented reality, the method comprising:
    transmitting terminal information, wherein the terminal information comprises a location information of the terminal and an original retrieval distance;
    receiving object information corresponding to an object, wherein the object information is based on the transmitted terminal information;
    overlapping the received object information over the corresponding object in the real-world image;
    calculating a distance between the terminal and the object based on location information of the object comprised in the received object information;
    setting the calculated distance as a reference distance;
    changing a zooming level of the real-world image for providing a second real-world image, wherein the second real-world image comprises a second object;
    calculating a virtual movement distance and a virtual movement location of the terminal based on the reference distance;
    setting a second retrieval distance, wherein the second retrieval distance is calculated by taking a difference in value between the virtual movement distance and the original retrieval distance; and
    resetting the terminal information based on the virtual movement location and the second retrieval distance.

25. The method of claim 24, further comprising:
    transmitting the reset terminal information;
    requesting and receiving second object information based on the reset terminal information; and
    overlapping the second object information over the second object in the second real-world image.

26. The method according to claim 24, further comprising:
    changing a zooming level of the real-world image for providing a second real-world image, wherein the second real-world image comprises a second object;
    calculating the virtual movement location of the terminal based on the reference distance and the changed zooming level;
    extracting feature information of the second object from the second real-world image;
    transmitting the virtual movement location of the terminal and the feature information of the second object;
    receiving second object information based on the virtual movement location of the terminal and the feature information of the second object; and
    overlapping the second object information over the second object in the second real-world image, wherein the second object information overlaps the second object at a location of the corresponding second object.

27. The method of claim 24, wherein the real-world image is a real-time image.

28. A terminal to provide augmented reality, the terminal comprising:
    a processor, comprising:
        a location information providing unit to provide location information of a terminal at a physical location,
        an information transmitting/receiving unit to transmit terminal information corresponding to the physical location, and to receive object information retrieved based on the terminal information corresponding to the physical location, and
        an image processing unit to overlap the object information on a real-world image, wherein the real-world image comprises an object corresponding to the object information; and
        a user view analyzing unit to calculate, via the processor, a virtual movement location of the terminal based on a zooming level, and to transmit terminal information corresponding the virtual movement location, and to receive object information retrieved based on the terminal information corresponding to the virtual movement location.

* * * * *